United States Patent
Nouzovsky et al.

(10) Patent No.: US 6,819,677 B1
(45) Date of Patent: Nov. 16, 2004

(54) METHOD AND APPARATUS FOR RECOVERING DATA THAT WAS TRANSPORTED UTILIZING MULTIPLE DATA TRANSPORT PROTOCOLS

(75) Inventors: Libor Nouzovsky, Austin, TX (US); Thomas A Zudock, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 09/246,653

(22) Filed: Feb. 8, 1999

(51) Int. Cl.[7] .................................................. H04J 3/22
(52) U.S. Cl. ........................ 370/466; 370/469; 725/80
(58) Field of Search ............................... 370/351, 352, 370/360, 363, 389, 395.1, 395.31, 395.5, 395.71, 427, 464, 466, 470, 471, 473, 474, 476, 489, 493, 503, 902, 912; 709/230, 236, 237, 238

(56) References Cited

U.S. PATENT DOCUMENTS

| | | | | |
|---|---|---|---|---|
| 5,864,708 A | * | 1/1999 | Croft et al. ..................... | 710/1 |
| 6,052,735 A | * | 4/2000 | Ulrich et al. ................ | 709/236 |
| 6,172,972 B1 | * | 1/2001 | Birdwell et al. ............ | 370/349 |
| 6,230,214 B1 | * | 5/2001 | Liukkonen et al. ............ | 710/1 |
| 6,334,160 B1 | * | 12/2001 | Emmert et al. ................ | 710/11 |
| 6,434,644 B1 | * | 8/2002 | Young et al. .................. | 710/63 |
| 6,481,013 B1 | * | 11/2002 | Dinwiddie et al. ........... | 725/80 |
| 6,529,522 B1 | * | 3/2003 | Ito et al. ..................... | 370/466 |
| 6,658,254 B1 | * | 12/2003 | Purdy et al. ................. | 455/445 |

* cited by examiner

*Primary Examiner*—Dang Ton
*Assistant Examiner*—Phuc Tran
(74) *Attorney, Agent, or Firm*—Timothy W. Markison

(57) ABSTRACT

A method and apparatus that includes processing for recovering data that was transported utilizing multiple data transport protocols, where such processing begins by receiving formatted data and decoding the formatted data in accordance with a second data transport protocol. The decoding recaptures a first formatted data and a first data transport identifier. The processing then continues by decoding the first formatted data in accordance with a first data transport protocol based on the first data transport identifier. For example, if the first data transport protocol is one of the IrDA data transport protocols and the second data transport protocol is the USB data transport protocol, the decoding of the formatted data is to recapture the data that is formatted in accordance with the IrDA protocol, where the first transport identifier includes information that identifies the start of IrDA formatted data and its length. It turn, by decoding the IrDA formatted data, the original data is recaptured.

6 Claims, 5 Drawing Sheets

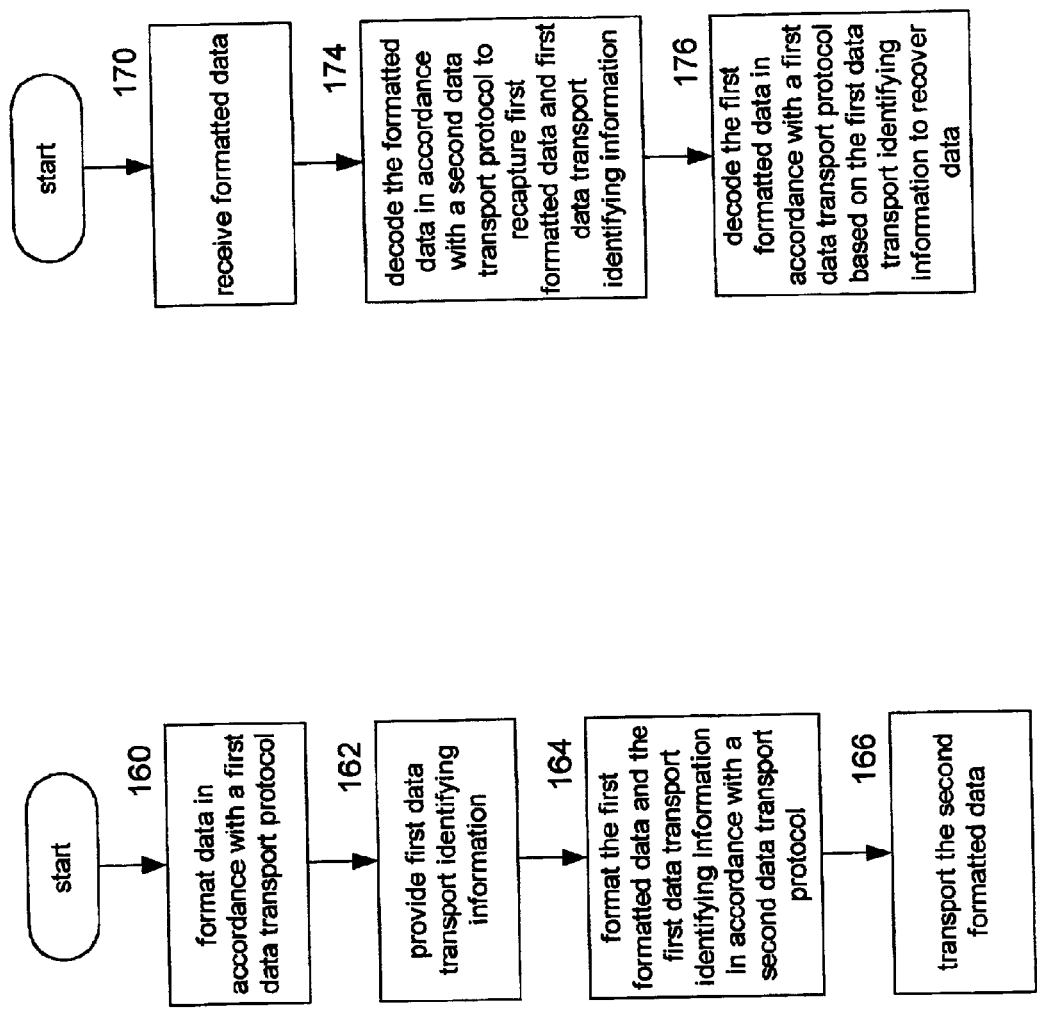

METHOD AND APPARATUS FOR RECOVERING DATA THAT WAS TRANSPORTED UTILIZING MULTIPLE DATA TRANSPORT PROTOCOLS

TECHNICAL FIELD OF THE INVENTION

This invention relates generally to data transmissions and more particularly to data transmissions that utilize multiple data transport protocols such as USB and IR data transport protocols.

BACKGROUND OF THE INVENTION

Data transmission techniques for transmitting data from one device to another device, wherein the devices are physically proximal (e.g., in the same room, the same building, or within a few thousand feet) to one another, are known. Such data transmission techniques utilize a particular transport medium (e.g., radio frequency (RF), infrared (IR), fiber optics, and/or wires) and a particular data transport protocol. For example, data transmissions utilizing an IR transport medium may be processed in accordance with an IrDA specified slow or fast IR data transport protocol, Amplitude Shift Keying (ASK) data transport protocol, or pulse code modulation (PCM) data transport protocol. Correspondingly, each of the transport mediums may be defined in accordance with standardized data transport protocols.

One such standardized data transport protocol is the Universal Serial Bus (USB) protocol, which prescribes data transmissions via a USB port. As is known, current state of the art computers include a USB port enabling the computer to communicate with a device (e.g., another computer, a printer, backup tape drive, etc.) at a rate up to 12 Mega Bits per second (Mbps). For the devices to communicate, they must be coupled via a cable that is capable of supporting such high speed data. As is also known, high speed data cables require shielding and low active and passive impedances, which add to the cost of the cable (e.g., approximately $20US for a six foot cable from a commercial retailer). In addition, if the USB port is incorporated into a laptop computer, a transient user would need to carry a USB cable.

To reduce the impact of utilizing the USB port (i.e., its cost and need for a special cable), a proposal was introduced in 1997 entitled "Universal Serial Bus IrDA Bridge Device Definition" (hereinafter the USB/IrDA Device) that suggested replacing the USB cable with IR transceivers. The USB/IrDA Device was specified to include a USB device controller, USB interface firmware, USB/IrDA bridge device firmware, IrDA interface firmware, and an IrDA transceiver. In general, the USB/IrDA Device was to receive data from a host (e.g., a computer) in accordance with the USB data transport protocol. As such, the host packetizes the data and sends the packets to the USB/IrDA Device. Upon receiving the packets, the USB device controller reconstructs the data and, via the USB interface firmware, provides the reconstructed data to the USB IrDA bridge device firmware. The USB IrDA bridge device firmware processes the data in accordance with an IRDA data transport protocol (e.g., slow or fast IR) to produce a frame of IR data. The IR data is provided to the IrDA transceiver via the IrDA interface firmware.

An issue with the USB/IrDA Device is that it requires a microprocessor, microcontroller, or digital signal processor to efficiently perform the significant amount of processing. Currently, such microprocessors, microcontrollers, or digital signal processors cost as much, if not more, than the USB cable. Thus, a main benefit of the USB/IrDA Device, i.e., less cost than the USB cable, is lost.

Therefore, a need exists for a method and apparatus that overcomes the above mentioned limitations of USB cables and the USB/IrDA Device.

BRIEF DESCRIPTION OF THE DRAWINGS

FIG. 7 illustrates a logic diagram of a method for transporting data utilizing multiple data transports protocols in accordance with the present invention; and FIG. 8 illustrates a logic diagram of a method for recovering data that was transported utilizing multiple data transport protocols in accordance with the present invention.

DETAILED DESCRIPTION OF A PREFERRED EMBODIMENT

Generally, the present invention provides a method and apparatus that includes processing for recovering data that was transported utilizing multiple data transport protocols. Such processing begins by receiving formatted data and decoding the formatted data in accordance with a second data transport protocol. The decoding recaptures a first formatted data and a first data transport identifier. The processing then continues by decoding the first formatted data in accordance with a first data transport protocol based on the first data transport identifier. For example, if the first data transport protocol is one of the IrDA data transport protocols and the second data transport protocol is the USB data transport protocol, the decoding of the formatted data is to recapture the data that is formatted in accordance with the IrDA protocol, where the first transport identifier includes information that identifies the start of IrDA formatted data and its length. It turn, by decoding the IrDA formatted data, the original data is recaptured. With such a method and apparatus, a transceiving module that transports multiformatted data does not require extensive processing power. For example, a USB/IR module that receives USB data packets, which include the original data that has first been formatted in accordance with the IrDA data transport protocol, does not require sophisticated processing. Therefore, a USB/IR module in accordance with the present invention has significantly less cost than the USB/IrDA Device as previously discussed.

Figure 1:
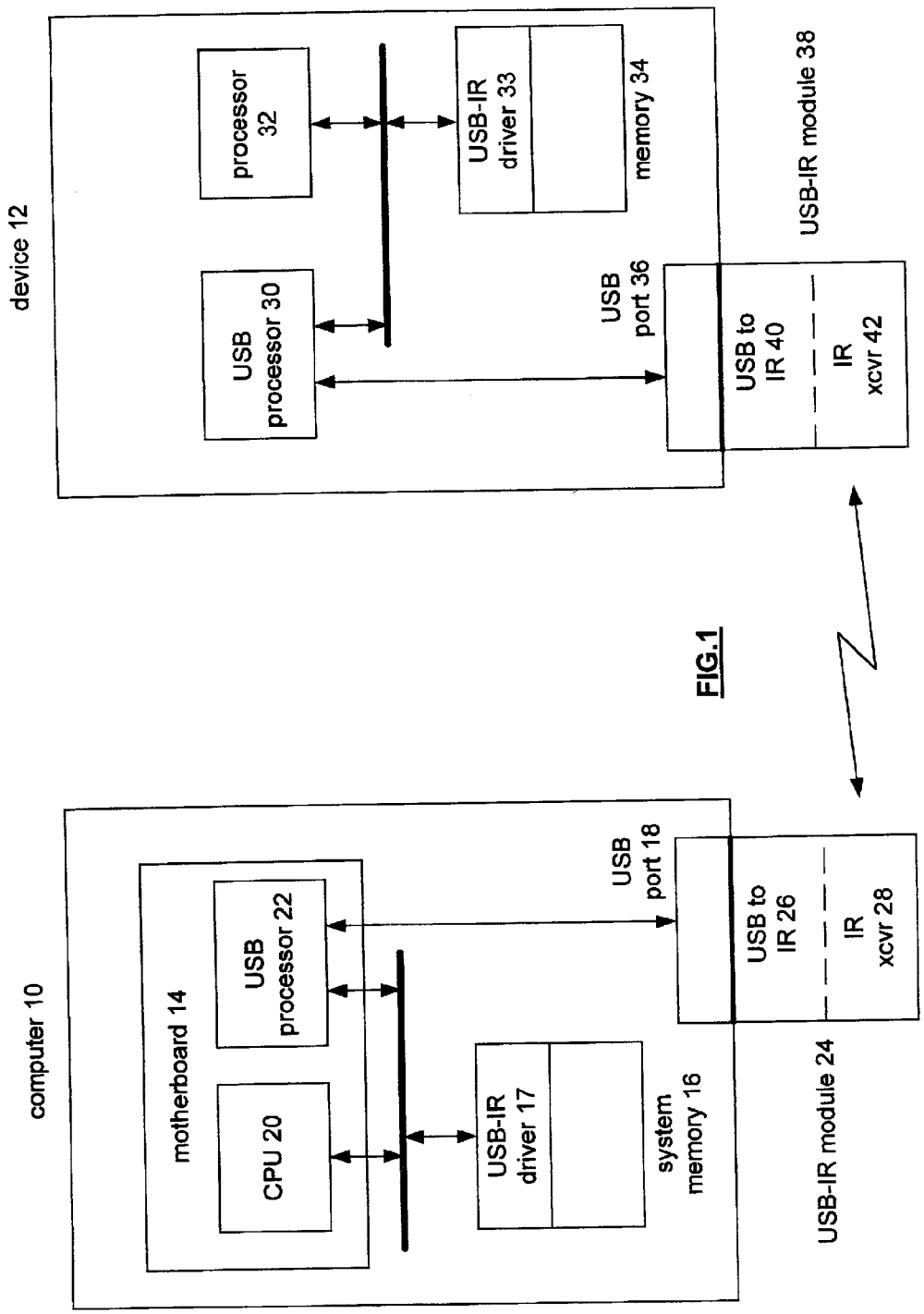
FIG. 1 illustrates a schematic block diagram of a computer and device in accordance with the present invention.

The present invention can be more fully described with reference to FIGS. 1 through 8. FIG. 1 illustrates a schematic block diagram of a computer 10 operably coupled via an IR communication path to a device 12. The computer 10 includes a motherboard 14, system memory 16, and a USB port 18. The motherboard 14 includes a central processing unit 20, and a USB processor 22 that are operably coupled via a bus to the system memory 16. The USB processor 22 is also coupled to the USB port 18. As one of average skill in the art would readily appreciate, the computer 10 includes more circuitry than shown in FIG. 1, however, such additional circuitry is not germane to the present invention thus, for the sake of clarity, such other circuitry has been omitted.

The system memory 16 stores a USB/IR driver software module 17, which is executed by the central processing unit 20 to prepare data for transport via the USB port 18. The data being transported by the central processing unit 20 may be data generated via execution of an application (e.g., word processing, drawings, etc.), a file transfer, HTML documents, etc. In operation, the central processing unit 20, via execution of the USB/IR driver 17, prepares the data for transport by first formatting it in accordance with an IrDA data transport protocol. Such an IrDA transport protocol may be for fast IR, medium IR, slow IR, amplitude shift keying, pulse position modulation, etc. In addition, the driver 17 includes instructions that cause the CPU 20 to generated frame identifying information (i.e., first format identifying information) that specifies, at a minimum, the start of an IR data frame and the length of the IR data frame. Having formatted the data in accordance with an IrDA data transport protocol, the central processing unit 20 provides the IR formatted data and the frame identifying information to the USB processor 22. The USB processor, utilizing at least a portion of the USB IR driver software, prepares the IR formatted data and the frame identifying information in accordance with the USB data transport protocol. As such, the USB processor packetizes the IR formatted data and the frame identifying information. The USB packets are then transported via the USB port to the USB IR module 24.

The USB IR module 24 includes a USB to IR section 26 and an IR transceiver section 28. The USB to IR section 26 receives the USB data packets, strips off the USB header information to recapture the IR formatted data and the frame identifying information. The USB to IR section 26 utilizes the frame identifying information to determine when it has recaptured a full frame of the IR formatted data. Upon receiving a full frame of IR formatted data, the USB to IR section 26 provides the full frame of recaptured IR formatted data to the IR transceiver section 28. The IR transceiver section 28 converts the IR formatted data, which is a digital format, into pulses that are transmitted utilizing a transmitting LED.

The device 12 includes a USB processor 30, a processor 32, memory 34 and a USB port 36. Coupled to the USB port 36 is a USB/IR module 38. The USB/IR module 38 receives the infrared transmitted pulses from USB/IR module 24 via the IR transceiver section 42. The IR transceiver section 42 converts the infrared pulses into digital data. As the digital data is stored, the USB to IR section 40 converts the stored data into USB packets. The USB packets are then provided to the USB processor 30 via the USB port 36. As the USB processor 30 receives the USB packets, it removes the USB header information to recapture the IR formatted data. Recall that the data however is IR data, i.e., has been formatted in accordance with an IrDA data transport protocol.

The processor 32 executes the USB/IR driver 33, which is stored in memory 34, to rapture the original data from the IR formatted data. As such, by having the processors 20 and 32 prepare the data in accordance with an IrDA data transport protocol, the USB modules 24 and 38 are not required to do such formatting. As such, the USB modules 24 and 38 can include significantly less processing than the USB/IrDA Device as previously mentioned. As such, the USB/IR modules 24 and 38 only need to include enough processing to remove the USB header information, to recognize when a full frame of data has been received, encode the digital IR formatted data into pulses, and to decode pulses to recapture IR formatted data.

Figure 2:
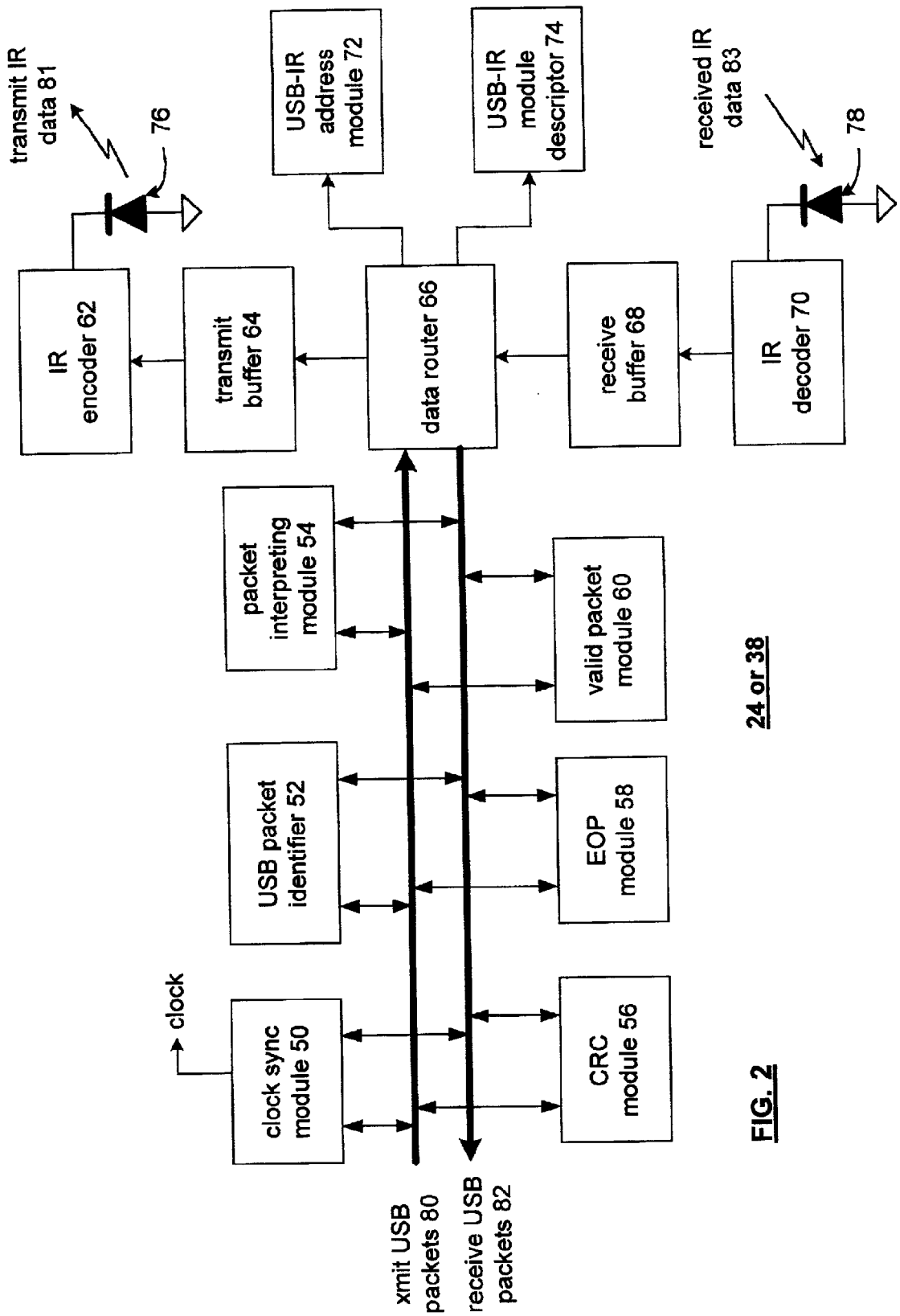
FIG. 2 illustrates a schematic block diagram of a USB/IR module in accordance with the present invention.

FIG. 2 illustrates a schematic block diagram of the USB 24 or 38. The USB module 24 or 38 includes a clock sync module 50, a USB packet identifier 52, a packet interpreting module 54, a CRC module 56, an end of packet module 58, a valid packet module 60, an IR encoder 62, a transmit buffer 64, a data router 66, a received buffer 68, an IR decoder 70, a USB/IR address module 72, a USB/IR module descriptor 74, a light transmitting diode 76, and a light receiving diode 78. The USB/IR module 24 or 38 also includes a received USB bus and a transmit USB bus operably coupled to receive USB data packets 82 and to transmit USB data packets 80. In one embodiment, the transmit and receive paths are a single bus that are operated in a half duplex manner.

The clock sync module 50 is operably coupled to the bus to determine a clock signal from the data packets being transported over the bus. The clock sync module 50 includes a clock circuit that has a frequency approximately equal to the data rate of the USB port, which may be in the range of 1.5 megabits per second to 12 megabits per second. As such, the clock sync module 50 functions to synchronize the internal clock with the data being transported via the bus. The synchronized clock is provided to the other modules within the USB/IR module 24 or 38.

The USB packet identifier 52, the packet interpreting module 54, the valid packet module 60, the CRC module 66, and the end of packet module 58 operate in concert to detect the proper receipt and/or transmission of USB data packets 80 or 82. In addition, the modules strip off the USB header information from the data packets such that for received USB data packets 80, only the payload is being provided to the data router 66. The USB packet identifier 52, the packet interpreting module 54, the CRC module 56, the end of packet module 58 and the valid packet module 60 are implemented in accordance with the USB standard which are also included in the USB processor 22 or 30. As such, no further discussion of these modules will be presented except to further illustrate the present invention.

Data router 66 is operably coupled to route data via the IR paths to the USB buses and also to route configuration data. For example, when IR data 83 is being received via LED 78, the IR data is processed by the IR decoder 70. The IR decoder converts IR pulses into digital information, which is stored in the received buffer 68. The decoded data is stored in the received buffer 68 until an efficient amount of data is stored to produce a USB packet. Once an sufficient amount of data is stored, the data router 66 provides the data to the modules 52–60 to prepare the USB data packet 82. For USB data packet to be transmitted, the data router 66 receives the payload of the data packets and routes it to the transmit buffer 64. When a full frame of IR data has been stored in the transmit buffer 64, the data is provided to the IR encoder 62. The IR encoder 62 takes the digital frame of information and produces IR pulses, which are transmitted via LED 76.

The data router 66 also processes configuration data, where the configuration data may be a request for peripheral device descriptor information or a peripheral device address. When the computer 10 is booting up, and executing its system start up routine, the computer recognizes the USB/IR module 24. Upon recognizing this module, it requests peripheral device description information, which is stored in the USB/IR module descriptor 74. Such description information may indicate that the device is a USB/IR module and may also indicate the device 12. When the computer receives the peripheral device description information, it assigns a peripheral device address to the device 12. The peripheral device address is provided to the USB/IR module 24 and stored within the USB/IR address module 72. As such, the data router 66 includes sufficient processing to recognize when the incoming or outgoing data is data or configuration data.

Figure 3:
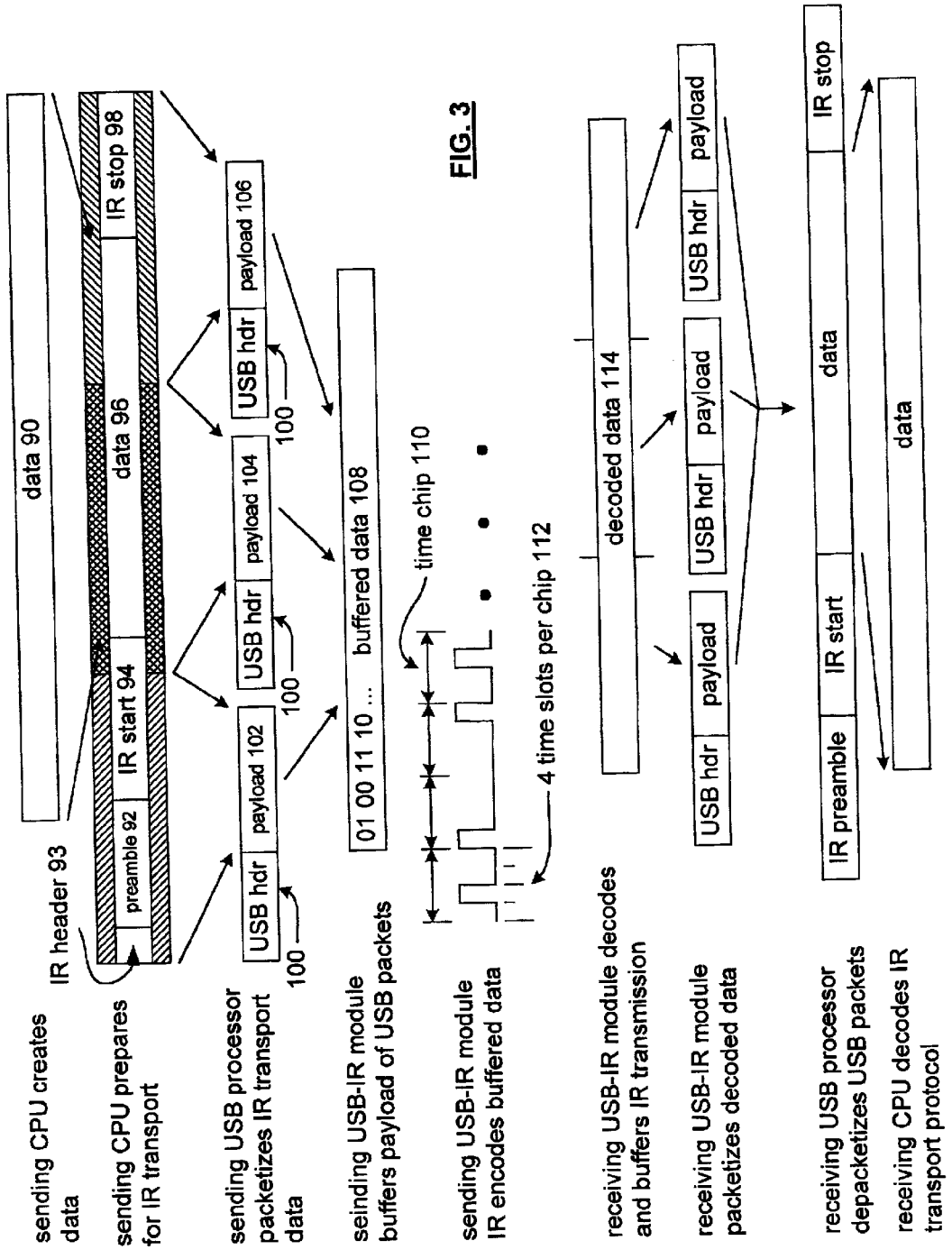
FIG. 3 illustrates a graphical representation of data transport conversion in accordance with the present invention.

FIG. 3 illustrates a graphic representation of data transporting in accordance with the present invention. The illustration of FIG. 3 assumes that data is being transported between two devices that include central processing units. The data transport process begins when the sending CPU creates data 90. The sending CPU then prepares for IR data transportation by executing the USB/IR driver 17. By executing the driver 17, the CPU prepares an IR header 93 and IR formatted data. The IR formatted data includes, for FIR, an IR preamble 92, an IR start flag 94, the data 96, and an IR stop flag 98. The IR header 93 includes data that identifies the being of the IR formatted data and the length of the IR formatted data.

The sending USB processor receives the IR formatted data and the IR header 93 and packetizes the data to produce USB packets. Each of the USB packets includes a USB header 100 and a payload 102, 104 and 106. The payload 102, 104, and 106 corresponds to portions of the IR data (i.e., the IR header and the IR formatted data). As shown, payload 102 stores the IR header 93, the IR preamble 92 and a portion of the IR start flag 94. Payload 104 stores the remainder of the IR start flag and a portion of the data 96. Payload 106 stores the remainder of the data and the IR stop flag. The sending USB processor transports the USB packets to the sending USB/IR module via the USB ports.

The sending USB/IR module receives the USB data packets and removes the USB header 100. The payloads are then buffered to produce buffer data 100. Note that the sending USB/IR module buffers the payloads until it determines that a full frame of IR formatted data has been stored. This may be done by interpreting the IR header to recognize the start of the IR formatted data and to determine its length. From this information, the sending USB/IR module can readily determine a full frame of IR formatted data. Alternatively, the sending USB/IR module may be programmed to recognize the preamble 92, the IR start flag 94 and the IR stop flag 98 to determine the full frame of IR formatted data. This latter approach, however, requires more processing within the USB/IR module. Further note that the buffered data is in a digital format.

The sending USB/IR module then IR encodes the buffer data. For example, assume that the buffer data 108 begins with the binary digits of 01001110. Further assume that the IR formatted data and the IR encoding is in accordance with the four pulse position module technique. As such, each time chip 110 includes four time slots 112. Thus, when the pulse is in the first time slot of the chip, it represents the binary value 00, when in the second time slot, it represents the binary value 01, in the third time slot it represents 10, and in the fourth slot it represents 11.

The IR encoded data is then transmitted over an IR transmission path (i.e., the air), to the receiving USB/IR module. The receiving USB/IR module decodes the IR encoded data (i.e., reverses the process shown in the previous line), and buffers the IR formatted data as decoded data 114. The receiving USB/IR module then creates USB data packets from the encoded data. This is the similar process that the sending USB processor performs to packetize IR transport data. The USB data packets are then provided to the receiving USB processor via the USB port of the receiving device. The receiving USB processor depacketizes the packets to recapture the IR transport data, or IR formatted data. The IR transport data is then processed by the central processing unit to decode the IR transport protocol thereby recapturing data 90.

By having the sending and receiving CPUs perform the IR transport protocol formatting and deformatting, the USB/IR modules 24 and 38 need only include sufficient processing to recognize and interpret the IR header, or to recognize the preamble 92, start flag 94, and stop flag 98 within the pay loads 100 to 104 and 106. Having recaptured this information, the buffered data 108 is in the IR transport data format, which is readily encoded into IR pulses. Therefore, the USB/IR modules 24 and 38 do not require expensive processors to perform its functionality thus is significantly less costly to produce than the USB/IR Device.

Figure 6:
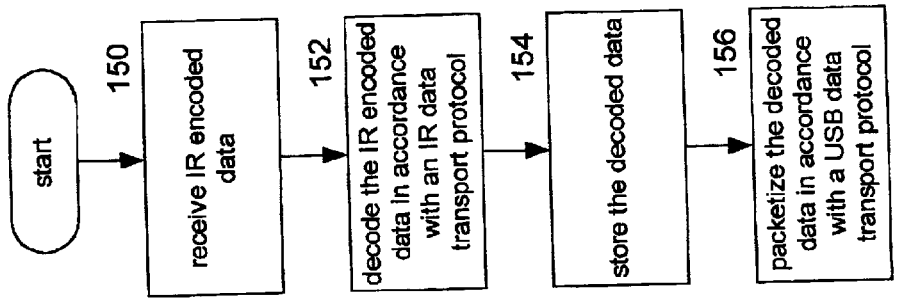
FIG. 6 illustrates a logic diagram of a method for providing USB to IR data transmissions in accordance with the present invention.
Figure 4:
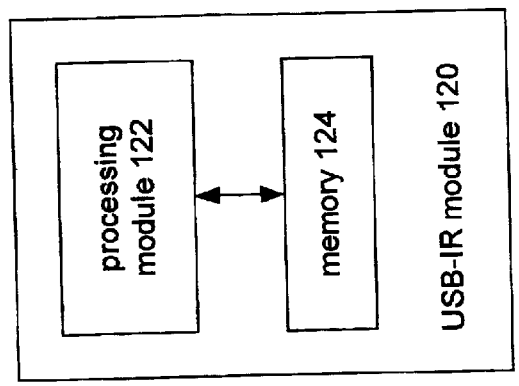
FIG. 4 illustrates a schematic block diagram of an alternate embodiment of a USB/IR module in accordance with the present invention.

FIG. 4 illustrates a schematic block diagram of a USB/IR module 120 that includes a processing module 122 and memory 124. The processing module 122 may be a single processing device or a plurality of processing devices. Such a processing device may be a limited functionality microprocessor, microcontroller, digital signal processor, state machine and/or logic circuitry. The memory may be read-only memory, random access memory, reprogrammable memory and/or any circuitry that stores operational instructions. Note that when the processing module 122 performs one or more of its functions utilizing a state machine or logic circuitry, the memory storing the corresponding operational instructions is embedded within the circuitry comprising the state machine or logic circuit. The operational instructions stored in memory 124 and executed by processing module 22 are illustrated in FIGS. 5 and 6.

Figure 5:
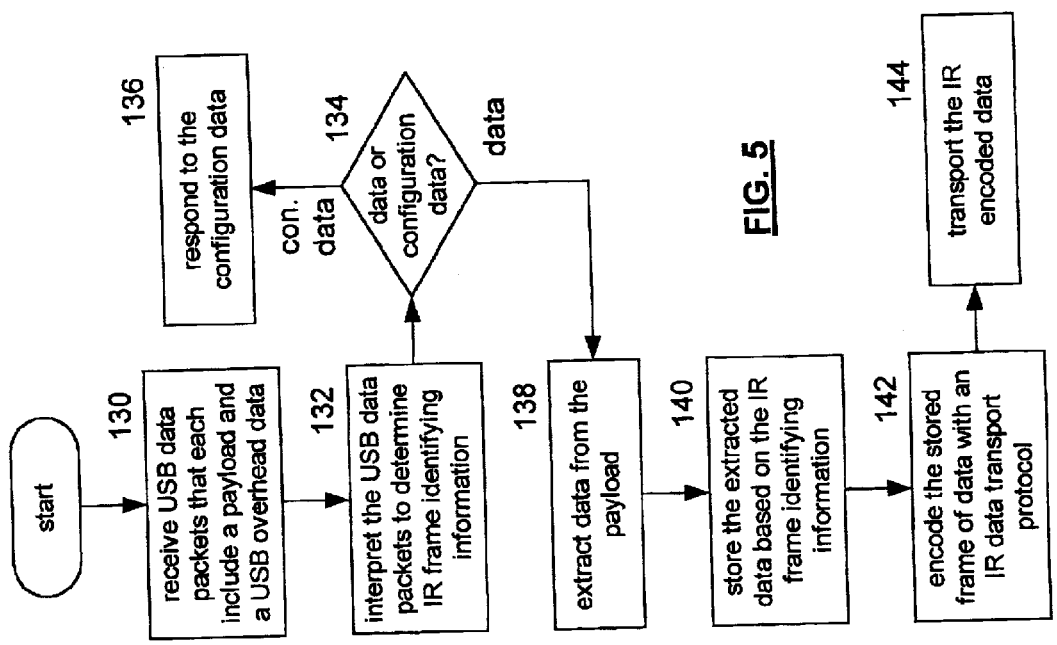
FIG. 5 illustrates a logic diagram of a method for providing USB to IR data transmissions in accordance with the present invention.

FIG. 5 illustrates a logic diagram of a method for providing USB to IR transmissions. The process begins at step 130 where USB data packets are received, wherein each USB data packet includes a payload and USB overhead data. Note that the USB overhead data is prescribed in the USB specification. The process then proceeds to step 132 where the USB data packets are interpreted to determine IR frame delineation information. The IR frame identifying information includes a header and IR frame link information.

The process then proceeds to step 134 where a determination is made as to whether the data being received within the USB packets is data or configuration data. When the data is configuration data, the process proceeds to step 136 where a response is prepared in accordance with the configuration data. Note that the configuration data includes a request for peripheral device description information or a peripheral device address. Such configuration information is typically requested and transported during the initial boot-up of the computer system or upon reboots of the computer system.

If the USB data being received is data, the process proceeds to step 138 where the data is extracted from the payload. The process then proceeds to step 140 where the extracted data is stored based on the IR frame identifying information. In other words, based on the length of the IR frame, a sufficient amount of memory is allocated. When that memory is full, a full frame of IR data has been stored. The process then proceeds to step 142 where the stored frame of data is encoded in accordance with an IR data transport protocol. The encoding typically will not occur until the encoding is enabled, which occurs when the IR frame identifying information indicates that a full frame has been stored and/or when requested by the CPU. In other words, when the allocated memory has been fully utilized, a full frame is stored and the encoding can commence. Note that the IR transport protocol may be in accordance with the slow IR IrDA protocol, medium IR IrDA protocol, the fast IR IrDA protocol and/or amplitude shift keying. Further note that the USB/IR module does not generate the preamble, start flag or stop flag for these protocols, it merely takes the digital data and converts it to IR pulse information. The process then proceeds to step 144 where the IR encoded data is transported.

FIG. 6 illustrates a logic diagram for receiving USB to IR data transmissions. The process begins at step 150 where IR encoded data is received. The process then proceeds to step 152 where the IR encoded data is decoded in accordance with the IR data transport protocol. In other words, the received IR pulses are converted into digital information based on the data transport protocol. This was illustrated and described previously with respect to FIG. 3.

The process then proceeds to step 154 where the decoded data is stored. The process then proceeds to step 156 where the stored data is packetized in accordance with the USB data transport protocol. Typically, the packetizing of the decoded data will occur in response to a request for USB data packets from the host.

FIG. 7 illustrates a logic diagram of a method for transporting data utilizing multiple data transport protocols, which may be executed by the computer 10 and/or the device 12. The process begins at step 160 where data is formatted in accordance with a first data transport protocol. The first data transport protocol is one of many data transport protocols that include slow speed USB, an infrared transport protocol, fast speed USB, slow or medium IR in accordance with an IrDA specified infrared data transport protocol, a fast IR in accordance with the IRDA specified infrared data transport protocol, and amplitude shift-keying. Note that if the first data transport protocol is the slow or fast IR in accordance with the IrDA specified infrared transport protocol and the second data transport protocol is the slow speed USB or the fast speed USB (12 megabits per second, while the slow speed is 1½ megabits per second), the frame of data is delineated by IR frame delineation information, which acts as the transport identifying information. Further note that the first data transport protocol may be identified based on connectivity information (i.e., the host recognizes that it is coupled to a USB/IR module). Still further note that the formatting of the data may require portions of the data to be altered when such data would be confused with frame delineation information. For example, the preamble may include data of 0xC0 which if unaltered indicates a portion of the start flag, stop flag or preamble, the data is converted into 0x7D.

The process then proceeds to step 162 where the first data transport identifying information is provided along with the first encoded first formatted data. Note that the first data transport identifying information may be generated as IR frame delineation information when the USB to IR conversion is being performed. Further note that the IR frame delineation information may include an identifying header and an IR frame link value, or information.

The process then proceeds to step 164 where the first formatted data and the first data transport identifying information are formatted in accordance with a second data transport protocol. For example, if the first data transport protocol is in accordance with an IrDA data transport protocol, and the second is in accordance with the USB data transport protocol, the resulting data packets from step 164 are in accordance with the USB data transport protocol. The process then proceeds to step 166 where the second formatted data is transported via a port, such as a USB port.

FIG. 8 illustrates a logic diagram of a method for recovering data that was transported using multiple data transport protocols, which may be executed by the computer 10 and/or the device 12. The process begins at step 170 where formatted data is received. As the formatted data is received, or prior to, a first data transport protocol and a second data transport protocol may be identified based on connectivity information. Such connectivity information is usually determined during the boot-up of the computer or device where it recognizes peripherals attached thereto, identifies the peripheral and assigns an address.

The process then proceeds to step 174 where the formatted data is decoded in accordance with a second data transport protocol to recapture first formatted data and first data transport identifying information. Note that the first and second data transport protocols may be one of the USB data transport protocols or one of the IrDA data transport protocols. When the first data transport protocol is in accordance with an IrDA data transport protocol, the first data transport identifying information may be IR frame delineation information that includes an identifying header and IR frame link information.

The process then proceeds to step 176 where the first formatted data is decoded in accordance with a first data transport protocol based on the first data transport identifying information to recover the data. Note that if the encoded data had portions of it that were altered due to violations of the data transport protocol, the altered portions are re-altered to recapture the original data.

The preceding discussion has presented a method and apparatus for providing an efficient and economical USB to IR transport module. By including a USB/IR driver that is executable by the central processing unit, the central processing unit performs the operational intensive function of preparing the data in accordance with an IrDA data transport protocol. In addition, the CPU adds an IR header to the prepared IR frame of data. The IR header indicates the beginning of the new IR frame and the length of the frame. Based on this information, the USB/IR module needs to include sufficient processing to recognize the IR header and to allocate sufficient memory to store the IR frame of data. As such, simple processing circuits may be employed in the USB/IR module making it more cost effective than the USB/IR Device.

What is claimed is:

1. A method for recovering data that was transported utilizing multiple data transport protocols, the method comprises the steps of:

receiving infrared (IR) encoded and IR formatted data via an IR transmission path;

IR decoding the IR encoded and IR formatted data to recapture IR formatted data, wherein the IR formatted data includes IR transport identifying information;

packetizing the IR formatted data in accordance with universal serial bus (USB) data transport protocol to produce USB packets;

transporting the USB packets via a USB port to produce transported USB packets;

depacketizing the transported USB packets to recapture the IR formatted data; and decoding the IR formatted data in accordance with an IR data transport protocol based on the IR identifying information to recover data, wherein the IR data transport protocol including slow IR in accordance with an IrDA specified infrared data transport protocol, medium IR in accordance with the IrDA specified infrared data transport protocol, fast IR in accordance with the IrDA specified infrared data transport protocol, and amplitude shift keying (ASK); and the USB data transport protocol including a slow speed USB data transport protocol and a fast speed USB data transport protocol.

2. The method of claim 1, wherein the IR decoding of the IR formatted data further comprises decoding an IR frame delineation information as the IR identifying information.

3. The method of claim 2, wherein the IR frame delineation information includes an identifying header and IR frame length information.

4. A data communication device comprises:

a processing module; and memory operably coupled to the processing module, wherein the memory store operational instructions that, when processed by the processing module, cause the processing module to receive infrared (IR) encoded and IR formatted data via an IR transmission path;

IR decode the IR encoded and IR formatted data to recapture IR formatted data, wherein the IR formatted data includes IR transport identifying information;

packetize the IR formatted data in accordance with universal serial bus (USB) data transport protocol to produce USB packets;

transport the USB packets via a USB port to produce transported USB packets;

depacketize the transported USB packets to recapture the IR formatted data; and decode the IR formatted data in accordance with an IR data transport protocol based on the IR identifying information to recover data, wherein the IR data transport protocol including slow IR in accordance with an IrDA specified infrared data transport protocol, medium IR in accordance with the IrDA specified infrared data transport protocol, fast IR in accordance with the IrDA specified infrared data transport protocol, and amplitude shift keying (ASK); and the USB data transport protocol including a slow speed USB data transport protocol and a fast speed USB data transport protocol.

5. The data communication device of claim 4, wherein the IR decoding of the IR formatted data further comprises decoding an IR frame delineation information as the IR identifying information.

6. The data communication device of claim 5, wherein the IR frame delineation information includes an identifying header and IR frame length information.

* * * * *